(12) United States Patent
Sutton et al.

(10) Patent No.: US 9,920,868 B2
(45) Date of Patent: Mar. 20, 2018

(54) EXTENDABLE STAND PIPE AND FLEX JOINT MODULES

(71) Applicants: Mark Shawn Sutton, Hiram, GA (US); William Wade Coots, Hiram, GA (US)

(72) Inventors: Mark Shawn Sutton, Hiram, GA (US); William Wade Coots, Hiram, GA (US)

(*) Notice: Subject to any disclaimer, the term of this patent is extended or adjusted under 35 U.S.C. 154(b) by 0 days.

(21) Appl. No.: 15/422,380

(22) Filed: Feb. 1, 2017

(65) Prior Publication Data
US 2017/0350544 A1    Dec. 7, 2017

Related U.S. Application Data (60) Provisional application No. 62/343,886, filed on Jun. 1, 2016.

(51) Int. Cl.
| | |
|---|---|
| *E03B 9/12* | (2006.01) |
| *F16L 27/053* | (2006.01) |
| *E03B 9/04* | (2006.01) |
| *E03B 9/10* | (2006.01) |
| *E03B 9/08* | (2006.01) |
| *E03B 9/02* | (2006.01) |

(52) U.S. Cl.
CPC .............. *F16L 27/053* (2013.01); *E03B 9/02* (2013.01); *E03B 9/04* (2013.01); *E03B 9/08* (2013.01); *E03B 9/10* (2013.01); *E03B 9/12* (2013.01); *Y10T 137/5456* (2015.04)

(58) Field of Classification Search
CPC ..... E03B 9/02; E03B 9/08; E03B 9/10; E03B 9/12; Y10T 137/5456; Y10T 137/5485; Y10T 137/6995
See application file for complete search history.

(56) References Cited

U.S. PATENT DOCUMENTS

| 2,008,138 A | * | 7/1935 | Le Duc | E03B 9/10 125/11.15 |
| 2,083,054 A | * | 6/1937 | Cline | E03B 9/02 138/32 |
| 2,827,914 A | * | 3/1958 | Alters | E03B 9/10 137/364 |

(Continued)

FOREIGN PATENT DOCUMENTS

| CN | 103615032 | 11/2013 |
| CN | 203603212 | 7/2014 |

OTHER PUBLICATIONS

Simmons Patents, Patentability Search Report (dated Feb. 2016).
Triad Bellows, Flex Connections.
Flexicraft, Rubber Expansion Joints.

*Primary Examiner* — Kevin Murphy
(74) *Attorney, Agent, or Firm* — Monty Simmons; Simmons Patents (57) ABSTRACT

The disclosure teaches an adjustable/extendable piping system/module for associating fluid access products (such as fire hydrants) to a buried fluid source. The piping system defines an adjustable configuration that allows for the overall length of the piping system to be modified to compensate for different bury depths. The disclosure further teaches a flex module configured for associating a fluid product with a piping system connected to a fluid source. The flex module is configured to flex a predefined amount to prevent damage to the system from low energy impacts.

15 Claims, 10 Drawing Sheets

(56) References Cited

U.S. PATENT DOCUMENTS

| | | | | |
|---|---|---|---|---|
| 3,331,397 | A | * | 7/1967 | Mueller .................... E03B 9/04 137/797 |
| 3,738,390 | A | * | 6/1973 | Luckenbill ................ E03B 9/02 137/797 |
| 3,899,196 | A | * | 8/1975 | Dashner .................... E03B 9/04 285/2 |
| 3,961,642 | A | * | 6/1976 | Thomas .................... E03B 9/04 137/272 |
| 4,702,275 | A | * | 10/1987 | Ballun ...................... E03B 9/12 116/277 |
| 5,020,934 | A | | 6/1991 | Floren et al. |
| 8,640,728 | B2 | | 2/2014 | Sigelakis |
| 9,108,076 | B2 | | 8/2015 | Sigelakis |
| 9,194,519 | B2 | | 11/2015 | Holmes et al. |
| 2010/0229961 | A1 | | 9/2010 | Ball et al. |

* cited by examiner

EXTENDABLE STAND PIPE AND FLEX JOINT MODULES

CLAIM TO PRIORITY

This application claims priority to provisional application 62/343,886, filed on 1 Jul. 2016, which is incorporated by this reference for all that it discloses for all purposes.

TECHNICAL FIELD

The invention relates to the field of adjustable/extendable piping systems and flex joint modules for fluid access ports defined by products such as fire hydrants.

BACKGROUND OF THE INVENTION

Fluid delivery systems frequently provide access ports to allow a fluid consumer access to a fluid supplied by such systems. One such fluid delivery system is a water delivery system provided by utilities across the US. One type of access port provided by such systems is a fire hydrant. As is well known, fire hydrants (sometimes called "fire plugs") provide a source of water in most areas with municipal water service. The concept of "fire plugs" dates to at least the 1600s and during such era firefighters responding to a call would dig down to the water mains and hastily bore a hole to secure water to fight fires. When no longer needed, such holes were then plugged with stoppers. Thus, the "fire plug" was born; a colloquial term still used for fire hydrants today.

Modern fire hydrant systems typically provide the following components: (a) a connection ("boot") to the "mains" (the main fluid source), (b) stand pipe in fluid communication to the mains connection (boot), (c) a hydrant body connected to the stand pipe wherein the hydrant body defines an output port, (d) a cap or bonnet mechanically connected to the upper end of the hydrant body, and (e) an operating nut configured to open and close a valve that allows or prevents water to flow from the main fluid source, to the hydrant body's output port.

It should be noted that at least a portion of the stand pipe is underground. Further, the burry depth of water mains to which fire hydrants connect vary from one installation site to another requiring some way of adjusting the length of the stand pipe element so that one end of the hydrant body is at or near ground level. Today's method of compensating for different burry depths is to use expensive stand pipe extensions. What is needed is a better and more cost-effective way to compensate for different burry depths.

Another issue with fire hydrants is damage due to being hit by objects such as vehicles. We have all seen movie scenes where a vehicle runs into a fire hydrant and water come shooting out of the fire hydrant way up into the air. Such a failure can be caused by even relatively minor collisions with a "wet barrel" fire hydrant causing extensive and expensive damage to the fire hydrant system. What is needed is an apparatus and method that allows for a more flexible fire hydrant system that is designed with relatively inexpensive components that yield/pivot at low energy impacts and break at high energy impacts to limit damage to the remainder of the system.

SUMMARY OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide an apparatus and method of associating an access product (such as a fire hydrant) to a buried fluid source wherein such apparatus and method are configured to compensate for variations in fluid source bury depths.

Another object of the present invention is to provide a flexible module for connecting an access product (such as a fire hydrant) to a pipe associated with a fluid source wherein said flexible module is configured to move/flex/pivot when subjected to low impact forces to minimize damage to the access product and fluid delivery system.

Another object of the present invention is to provide a fire hydrant with an adjustable body element that provides a range of adjustment to compensate for about 3.5 feet to 5.5 feet of variation in burry depth.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Repeat use of reference characters throughout the present specification and appended drawings is intended to represent the same or analogous features or elements of the present technology.

DISCLOSURE OF THE INVENTION

Detailed Description

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only, and is not intended as limiting the broader aspects of the present invention.

Construction Aids

For the purposes of this document two or more items are "mechanically associated" by bringing them together or into relationship with each other in any number of ways including a direct or indirect physical "releasable connections" (snaps, screws, Velcro®, bolts, etc.—generally connections designed to be easily and frequently released and reconnected), "hard-connections" (welds, rivets, macular bonds, generally connections that one does not anticipate disconnecting very often if at all—connections that are "broken" to separate), and/or "moveable connections" (rotating, pivoting, oscillating, etc.).

For the purposes of this document, unless otherwise stated, the phrase "at least one of A, B, and C" means there is at least one of A, or at least one of B, or at least one of C or any combination thereof (not one of A, and one of B, and one of C).

This document includes headers that are used for place markers only. Such headers are not meant to affect the construction of this document, do not in any way relate to the meaning of this document nor should such headers be used for such purposes.

While the particulars of the invention and associated technology may be described for use with fire hydrants, the invention may be adapted for use with any type of product associated with a fluid delivery system.

Figure 1:
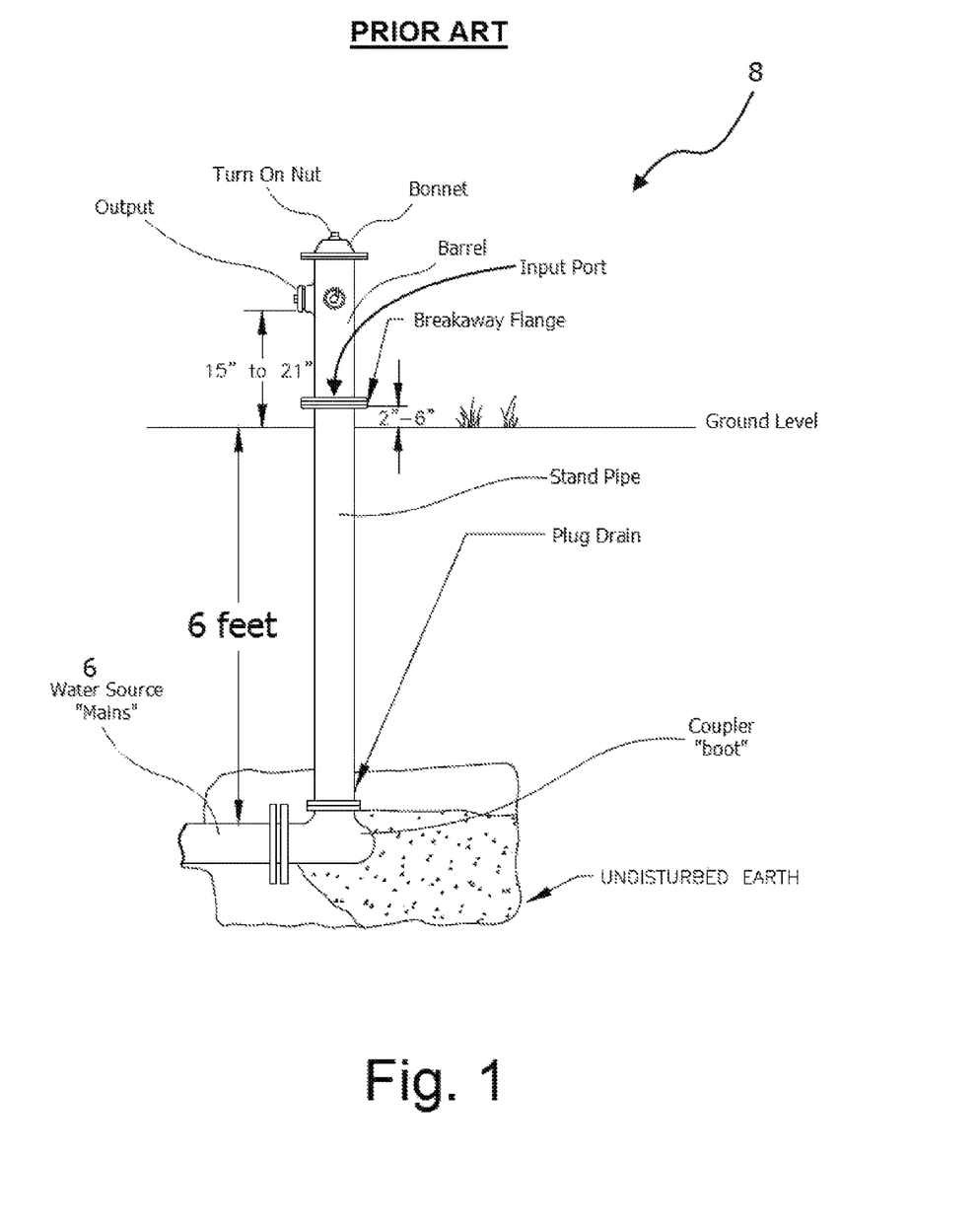
FIG. 1 is an elevation view of a typical prior art fire hydrant installation.

Referring now to FIG. 1, a prior art fire hydrant installation (8) is presented. For a typical prior art system, the fire hydrant defines a hydrant barrel mechanically associated with a top called a bonnet. The barrel also defines an output port where a user gains access to the fluid inside the barrel. The fire hydrant further defines an input port mechanically associated with one end of a standpipe via a breakaway flange. The breakaway flange is typically positioned 4 to 6 inches above the ground level and the fire hydrant output is typically positioned along the barrel so that it is 15 to 21 inches above ground level. The stand pipe extends through a support medium (such as dirt) so that one end of the standpipe is connected to a coupler or "boot" that is connected to a water source "mains" (generally 6 feet below ground level). For a typical installation, a valve is disposed within the coupler/boot. Such valve is connected to the turn on nut buy a rod that extends from the turn on nut, through the hydrant barrel, through the standpipe to the valve.

Most fire hydrants are "dry" in that there is no water in the stand pipe or hydrant when not in use (turn on nut in off position) as water "weeps" out of the system just above the valve in the boot via a plug drain. While the prior art system (8) does include a breakaway flange, when the barrel is struck by an object (such as a car), even at low speeds/forces, the hydrant system can still incur significant damage before such breakaway flange fails. Additionally, the distance from the water source "mains" is not always six feet which often requires stand pipes of different lengths. Embodiments of the disclosed inventions address such issues.

Figure 2:
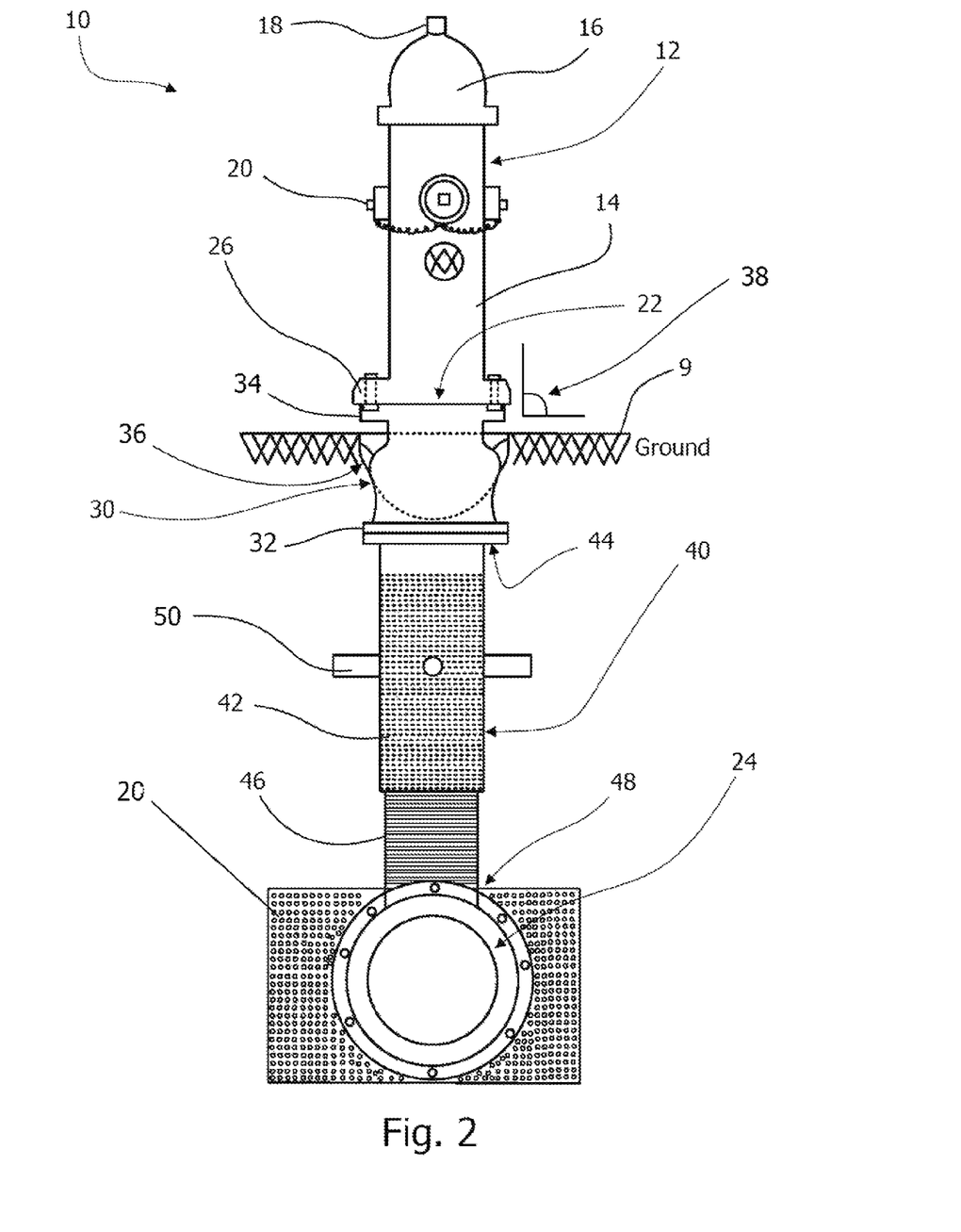
FIG. 2 is a front elevational view of one exemplary embodiment of a fire hydrant system according to one embodiment of the invention.

Referring now to FIG. 2, presented is a hydrant system (10) configured for connecting to a buried fluid source (6, FIG. 1) according to one exemplary embodiment of the present invention. Exemplary hydrant system (10) comprises a telescoping stand pipe module (40) comprising a first stand pipe element (42) defining a first stand pipe module end that defines stand pipe module output (44) and an opposing second stand pipe element (46) defining an opposing second stand pipe module end that defines stand pipe module input (48). For the current configuration, the first stand pipe element (42) defines an inner diameter that is bigger than the outer diameter of the second stand pipe element (46) so that the second stand pipe element (46) may be inserted into (or slide into) the first stand pipe element (42) thereby defining a telescoping function/configuration.

The stand pipe elements may be unthreaded where the second stand pipe element (46) simply slides in and out of the first stand pipe element (42) as needed to change its overall length. For the currently preferred configuration, however, the stand pipes are at least partially threaded and the length of the stand pipe module (40) can be changed by applying a force to stand pipe arms (50) in a first direction to lengthen stand pipe module (40) and applying a force in a second and opposition direction to shorten stand pipe module (40). Preferably the stand pipe module (40) provides for a range of adjustments of about 3 feet. For example, an appropriately configured stand pipe module would be adjustable from about 4 feet to about 7 feet in overall length. That said, adjustment ranges of about 50% fall within the scope and spirit of the invention. For example, if the typically system length is 6 feet, a system according to the present invention could be varied from about 3 feet to about 9 feet (50% shorter and 50% longer than 6 feet). Such functionality will be examined in more detail below. One of ordinary skill in the art will appreciate that such a configuration is particularly well suited for providing adjustable hydrant systems that are to be coupled to fluid sources buried at different depths.

The stand pipe module (40) is configured to extend through a support medium (e.g. dirt) to a fluid source coupler (24) in fluid communication with a fluid source (6, FIG. 1)

where the second stand pipe module end (48) is mechanically association with the fluid source coupler (24) thereby placing the stand pipe module (40) in fluid communication with such fluid source.

Still referring to FIG. 2, for one embodiment, the hydrant system (10) further comprises a flex module (30) defining a flex module input (32) and a flex module output (34). The flex module output (34) is mechanically associated with an access product (12) via coupling system (26) thereby connecting the access product (12) to a fluid source mains (6) via the stand pipe module (40). Any number of products can be associated with the fluid source mains (6), however, for the currently preferred embodiment, access product (12) is a fire hydrant and fluid source mains (6) is a water line. Such hydrant is preferably designed to AWWA standards and constructed from industry approved materials including high-density polyethylene (HDPE) SDR 11.

Figure 3:
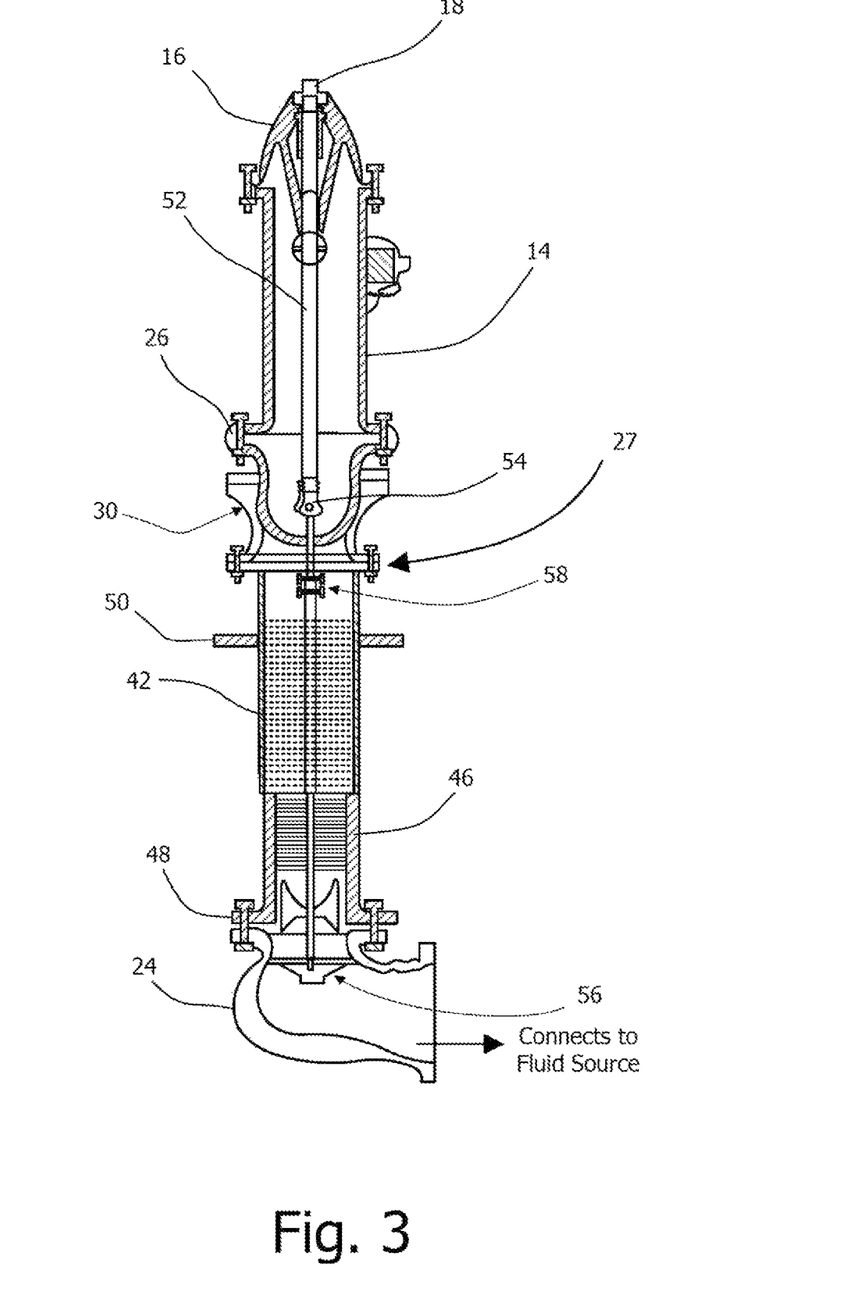
FIG. 3 is a side elevational view with a partial cut away section of a fire hydrant system according to one embodiment of the invention.

As best seen in FIG. 2 and FIG. 3, the flex module input (32) is mechanically associated with the stand pipe module output (44) via coupling system (27, FIG. 3) thereby placing the flex module (34) and the hydrant (12) in fluid communication with the fluid source. Examples of suitable coupling systems include a pair of flanges and a plurality of bolts used to secure and flanges with each other to define a water tight association.

At least one of the flange system (26) and flange system (27) define a hydrant breakaway feature so that the coupling system fails when hydrant (12) sustains an impact exceeding a predefined force—called the hydrant breakaway force (which is preferably less than the force needed to significantly damage the hydrant). One method of providing a breakaway feature is to use special bolts (e.g. hollow bolts) to mechanically associate the two flanges where such bolts are configured to fail at a force lower than what is needed to significantly damage hydrant (12). For the preferred embodiment, depicted in FIG. 3, the coupling system (27) that mechanically associates the flex module input (32) with the first stand pipe module output (44) defines a hydrant breakaway feature.

The flex module (30) may further comprise an adjustment-element (36, FIG. 2) configured to set a flex module output angle (38, FIG. 2) as describe in more detail later.

As best seen in FIG. 3, hydrant system (10) further comprises an adjustable rod coupler (52) defining a universal joint (54). Preferably, the universal joint (54) is defined along the adjustable rod coupler (52) at a location that places the universal joint (54) at least partially inside flex module (30). The adjustable rod coupler (52) extends through the approximate center of the hydrant system (10), from a turn on nut (18) defined by hydrant (12), through the flex module (30), and at least partially through the stand pipe module (40) to a valve (56) configured to selectively allow and prevent fluid flow between the fluid source and the hydrant (12).

Rod Coupler

Rod coupler (52) is now examined in more detail. The universal joint (54) is preferably defined along rod coupler (52) so that the universal joint is disposed at least partially inside flex module (30). The universal joint may be any suitable type of universal joint technology that will allow flex module (30) to pivot (as described later) without significant damage to the rod coupler or universal joint. Generally speaking, a universal joint (54) is a joint or coupling along rod coupler (52) that allows the rod to "bend" in any direction and that transmits rotary motion.

While flex module (30) is configured to pivot when a relatively low impact force is applied to hydrant (12), higher impact forces will eventually exceed the pivot capabilities of the flex module and cause the breakaway features (coupling system) to fail. When such occurs, breakaway rod interface (58) is configured to fail to prevent/minimize further damage to the rod coupler (52). Preferably, the portion of the rod coupler closest to the coupling system that defines the breakaway feature should define a breakaway rod interface location. For the currently preferred embodiment depicted in FIG. 3, the coupling system (27) defines the breakaway feature, and thus, the rod coupler section closest to the stand pipe module output (44) preferably defines a breakaway rod interface (58). Such a configuration will allow for easier access to repair the rod coupler (52) should the hydrant be subjected to a force that activates the system's breakaway features.

For one embodiment, at least a portion of rod coupler (52) is adjustable. For such embodiment, the rod coupler portion that extends through stand pipe module (40) is preferably itself adjustable. One example of an adjustable rod coupler (52) is a telescoping rod where adjustable rod coupler (52) comprises a first hollow rod section that defines a larger inner perimeter than the outer perimeter of a second rod section so the second rod section can slide in and out of the first rod section to change the length of the rod coupler. For such a rod configuration, a breakaway rod interface may not be necessary as the two rod sections can simply separate without damage. Yet another alternative embodiment is to use threaded rod sections where one rod section screws in and out of the other rod section to changes the rods overall length.

Flex Module

Figure 4:
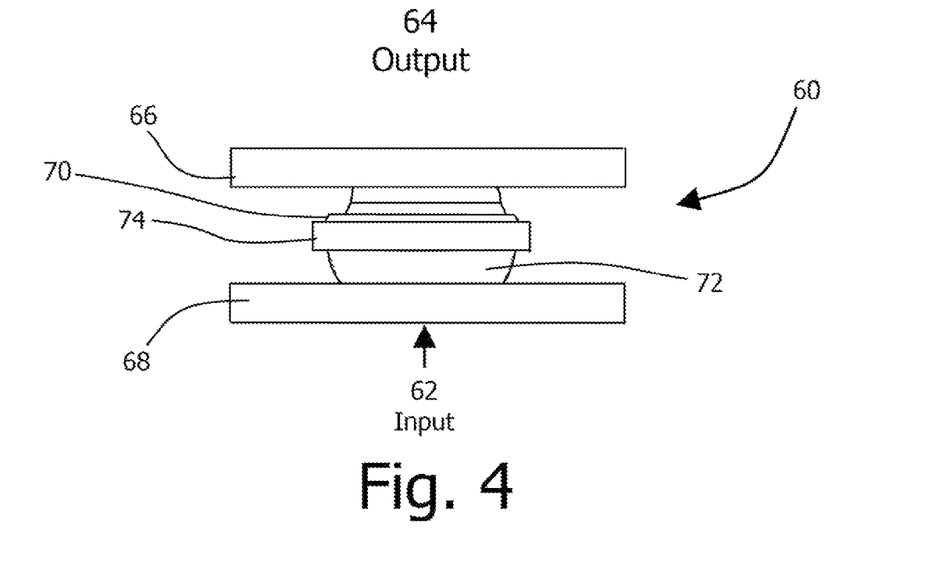
FIG. 4 is a side elevational view of one exemplary embodiment of a flex module.
Figure 5:
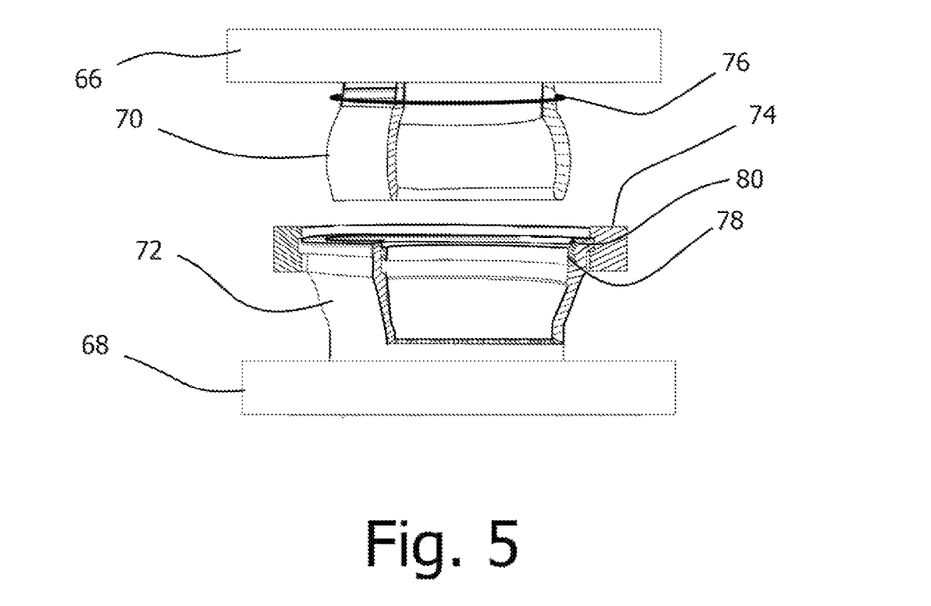
FIG. 5 is a partially exploded perspective view with a partial cut away section of the flex module presented in FIG. 4.
Figure 6:
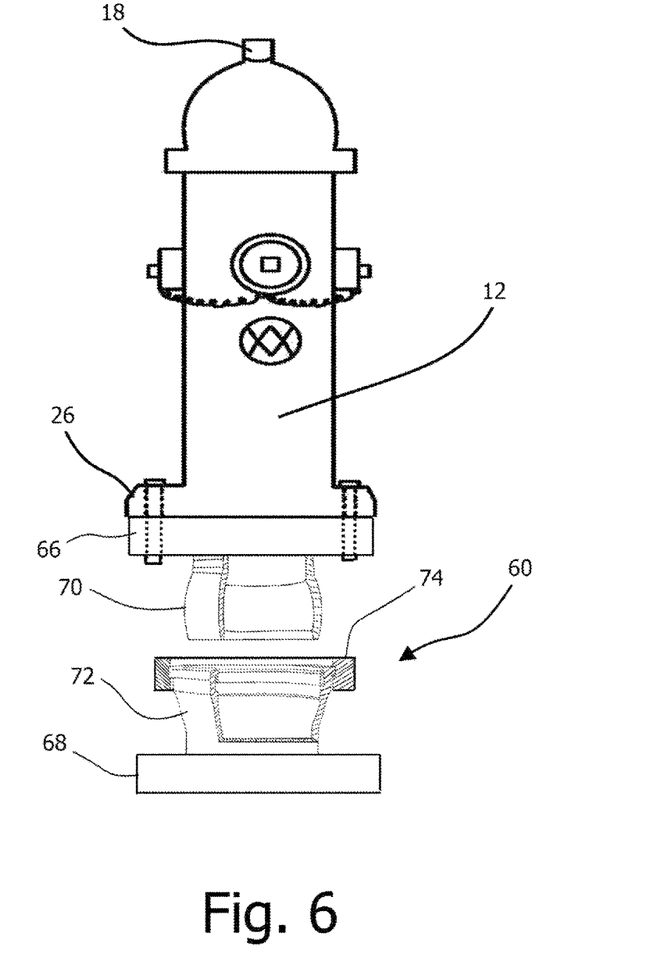
FIG. 6 depicts the flex module of FIG. 5 associate with a fire hydrant.

As best seen in FIG. 4, FIG. 5 and FIG. 6, attention is now directed more particularly to embodiments of the flex module (30). Flex module (30) can generally be described as an adjustable coupler assembly for connecting a hydrant (12) to a stand pipe module (40). As depicted in FIG. 4 and FIG. 5, one exemplary embodiment of a Flex Module (30) comprises a ball joint module (60). The ball joint module (60) defines a ball joint input (62) and a ball joint output (64). The ball joint output (64) is configured for being mechanically associated with a hydrant (12, FIG. 6) via a first ball joint coupling (66) and whereas ball joint input (62) is configured for being mechanically associated with a stand pipe module (40) via a second ball joint coupling (68). For the preferred embodiment, at least one of said first ball joint coupling (66) and said second coupling (68) define a breakaway feature where the coupling fails when a predefined hydrant-breakaway-pressure is exerted on the coupling. Ideally, the hydrant-breakaway-pressure is less than the force needed to cause structural damage (i.e. "significant damage") to the hydrant (12).

The Flex module (30) output coupling assembly that connects the flex module to the hydrant is preferably switchable so that any one of a polarity of coupling types can be associated with the flex module (30) as each hydrant manufacturer generally has their specific type of hydrant coupling configuration. Thus, for one configuration the Flex module (30) comes with a plurality on inter changeable flex module coupling types with each coupling type being compatible with a particular hydrant type. The same feature could also be used for the flex module (30) input couplings although the stand pipe output couplings are anticipated to be a standard type especially for stand pipe modules supplied with the system.

Please note that in this document "significant damage" simply means damage to an item that either (1) makes it more cost effective to replace the item than repair the item, and (2) makes it necessary to repair the item before it is reused. For example, a hydrant could still be used, without repair, after sustaining cosmetic type damage whereas "structural damage or significant damage" to the hydrant would require the hydrant to be scrapped or repaired before being reused.

As best seen in FIG. 5, for one preferred embodiment, flex module (30) comprises ball element (70) configured for being inserted into socket element (72). Ball element (70) is retain within socket element (72) by clamping element (74). An optional retaining ring (76), preferably made of a metal (such as stainless steel), can also be used to help retain ball element (70) within socket element (72). Embodiments of retaining ring (76) include circlips and binder rings and similar devices. For such embodiment, socket element (72) preferably defines a ring receiver (80) configured for receiving the retaining ring (76). For one embodiment, the retaining ring (76) is configured to fail under a predefined load to provide the previously described "breakaway" function. Such retaining ring breakaway feature can be use instead of a breakaway flange or in addition to a breakaway flange.

The socket element (72) is further configured to receive a sealing element (78) to provide a watertight association between ball element (70) and socket element (72). FIG. 6 shows a partial exploded view of such a ball joint module (60) associated with an access product (12).

Figure 7:
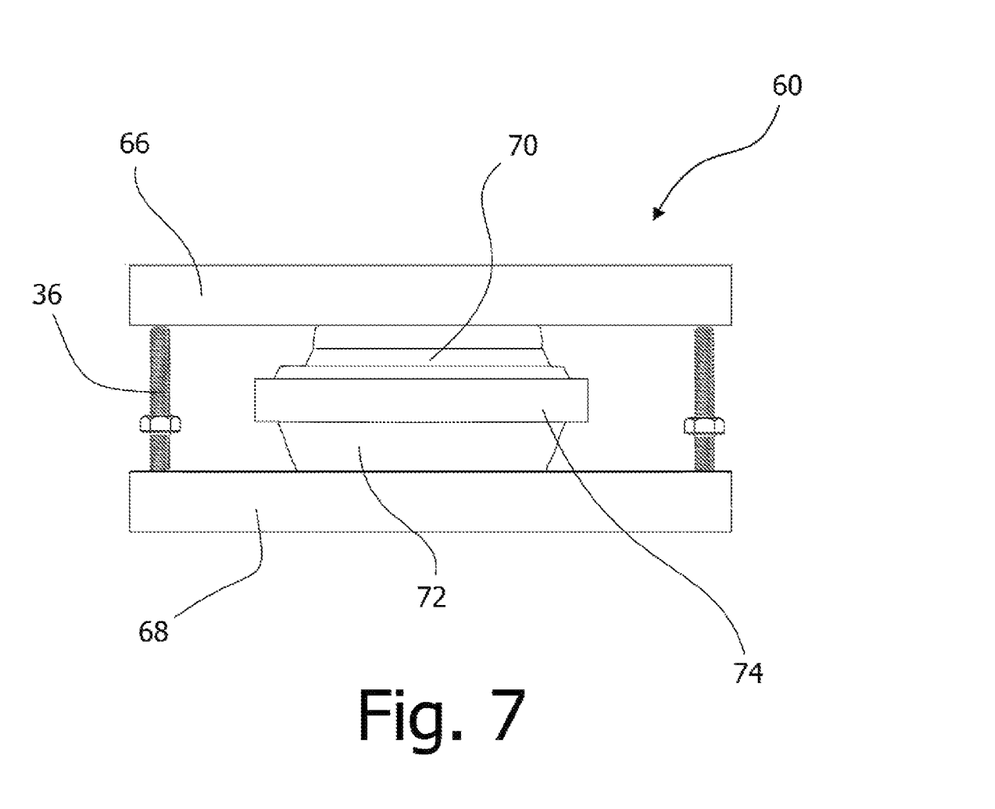
FIG. 7 is a side view of the flex module depicted in FIG. 4 with output angle adjustment elements.
Figure 7B:
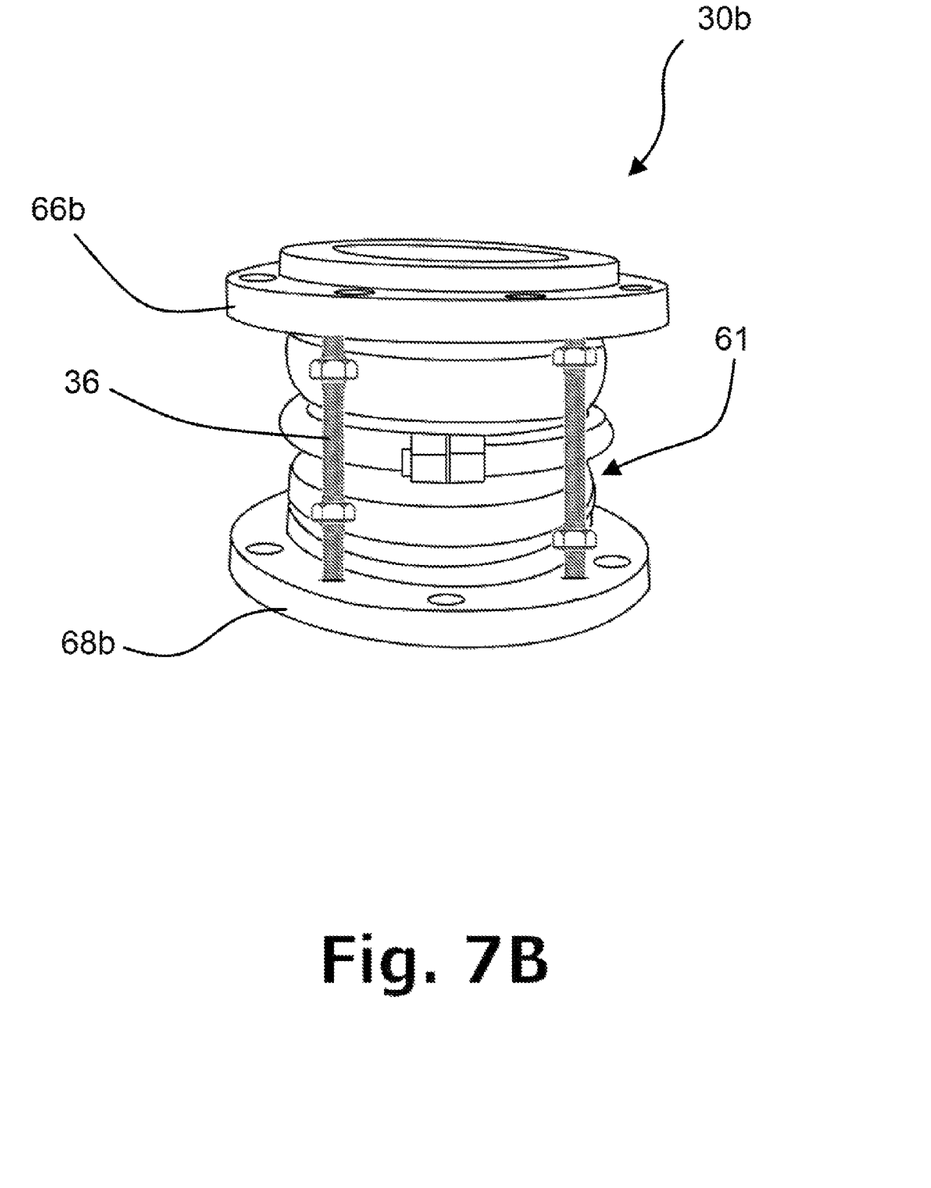
FIG. 7B is a side view of a flex module where the ball joint has been replaced with an expansion joint.

As depicted in FIG. 7B, alternative embodiments for flex module (30) include replacing the ball joint with a rubber expansion joint (61), to define a flex module (30b). Flex module (30b) can be made from any suitable elastomer material such as the ones manufactured by Flexicraft with the additions of first flex joint coupling (66b) configured for being associated with a fire hydrant input as described above and second flex joint coupling (68b) configured for being associated with a standpipe and adjustment elements (36). Similarly, expansion Joints made from metals may also be used such as modified version of the expansion joints manufactured by Triad Bellows.

Adjustment Element

For some installations, the user may desire to set/select the angle the access product (12) makes with some other reference point. For example, one may simply desire to make a hydrant (12) "plumb" (vertical or perpendicular) with a support surface such as ground level (floor, sidewalk, etc.). Notably, for prior art systems, if the stand pipe assembly is not "plumb", the prior art system's hydrant will not be plumb as there is no adjustment mechanism. Further, if the reference point is not "plumb" (e.g. slants), an installer may also wish for the hydrant (12) to "slant" the same amount. Regardless, for whatever reason, a user may wish to set the flex module output angle.

For this document, the "output angle" is the angle formed by the flex module input (32) relative to the flex module output (34) which can be determined by examining the first ball joint coupling (66) and second ball joint coupling (68). If the two coupling flanges are parallel, the output angle is zero. If the two flanges are not parallel, the angle formed by such two references lines is the output angle.

For the currently preferred embodiment, the flex module (30) defines an adjustment-element (36) feature for setting the module's output angle (38, FIG. 2). In FIG. 2, for example, the adjustment-element (36) comprises set screws or set pins and the input and output flanges shown in FIG. 2 are in parallel providing an output angle of zero. Such set screws maintain the desired angle until a predefine force is exceeded as explained later.

As depicted in FIG. 7, for one exemplary embodiment of flex module (30), the adjustment-element is defined by set screws (36). Set screws (36) screw into and extends perpendicularly from the second ball joint coupling (68) and push against the first ball joint coupling (66). The output angle is adjusted by changing the distance in which set screws (36) screw into the second ball joint coupling (68). One of ordinary skill in the art will appreciate that the same functionality can be achieved by screwing the set screws (36) into the first ball joint coupling (66) instead of the second ball joint coupling (68).

Figure 2B:
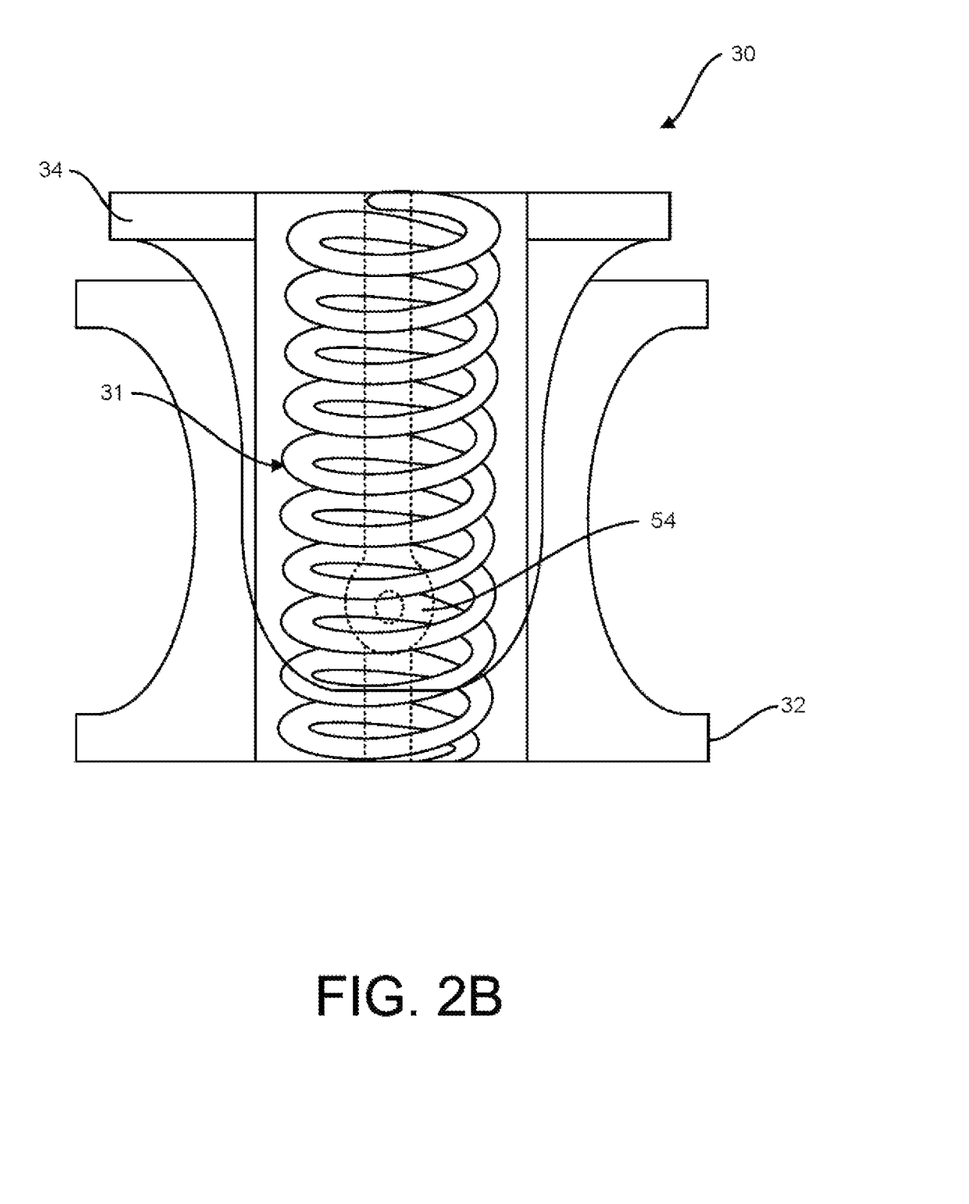
FIG. 2b depicts one exemplary embodiment of a ball joint with internal coil spring.

For embodiments where the adjustor-element (36) comprise set screws or pins, ideally such set screws or pins are configured to fail at a force lower than the force needed to activate the system's breakaway features to allow the flex module to flex/move/pivot at low energy impacts so that only the set screws/pins are damaged. For one alternative embodiment, instead of set screws, a resilient element, such as a coil spring (31, FIG. 2B), is used. Such coil spring (31) would extend around the outside of the ball element (70) and the socket element (72) and is disposed between the first ball joint coupling and the second ball joint coupling. Such resilient element would have sufficient strength to maintain a predefined output angle (such as zero). Alternatively, a cold Spring (31) would be disposed inside the ball joint coupling to provide the same functionality as depicted in FIG. 2B.

For yet alternative embodiment, clamping element (74) provides the adjustment feature. For such currently preferred embodiment, before securing the ball element (70) to the socket element (72) with clamping element (74), the output angle is set as desired and then clamping element (74) is engaged to firmly secure the ball element (70) with the socket element (72) where the clamping force is sufficient to maintain the set flex module output angle (38). Further, such clamping force is preferably low enough to allow the flex module (30) to flex/move/pivot at low energy impacts without activating the systems breakaway features. That said, when the flex module (30) has flexed/moved/pivoted to its maximum flex point, the system's breakaway elements fail to minimize damage to the hydrant (12) and/or stand pipe module (40). For the preferred embodiment, flex module (30) can provide about 15 to 20 inches of flex/movement/pivoting.

Stand Pipe Module

Attention is now directed more particularly to the stand pipe module (40). As noted above for FIG. 2 and FIG. 3, exemplary hydrant system (10) comprises a telescoping stand pipe module (40) comprising a first stand pipe element (42) defining a first stand pipe module end that defines stand pipe module output (44) and an opposing second stand pipe element (46) defining an opposing second stand pipe module end that defines stand pipe module input (48). For such configuration, the first stand pipe element (42) defines an inner diameter that is bigger than the outer diameter of the second stand pipe element (46) so that the second stand pipe element (46) may be inserted into (or slide into) the first stand pipe element (42) thereby defining said telescoping function/configuration.

Figure 8:
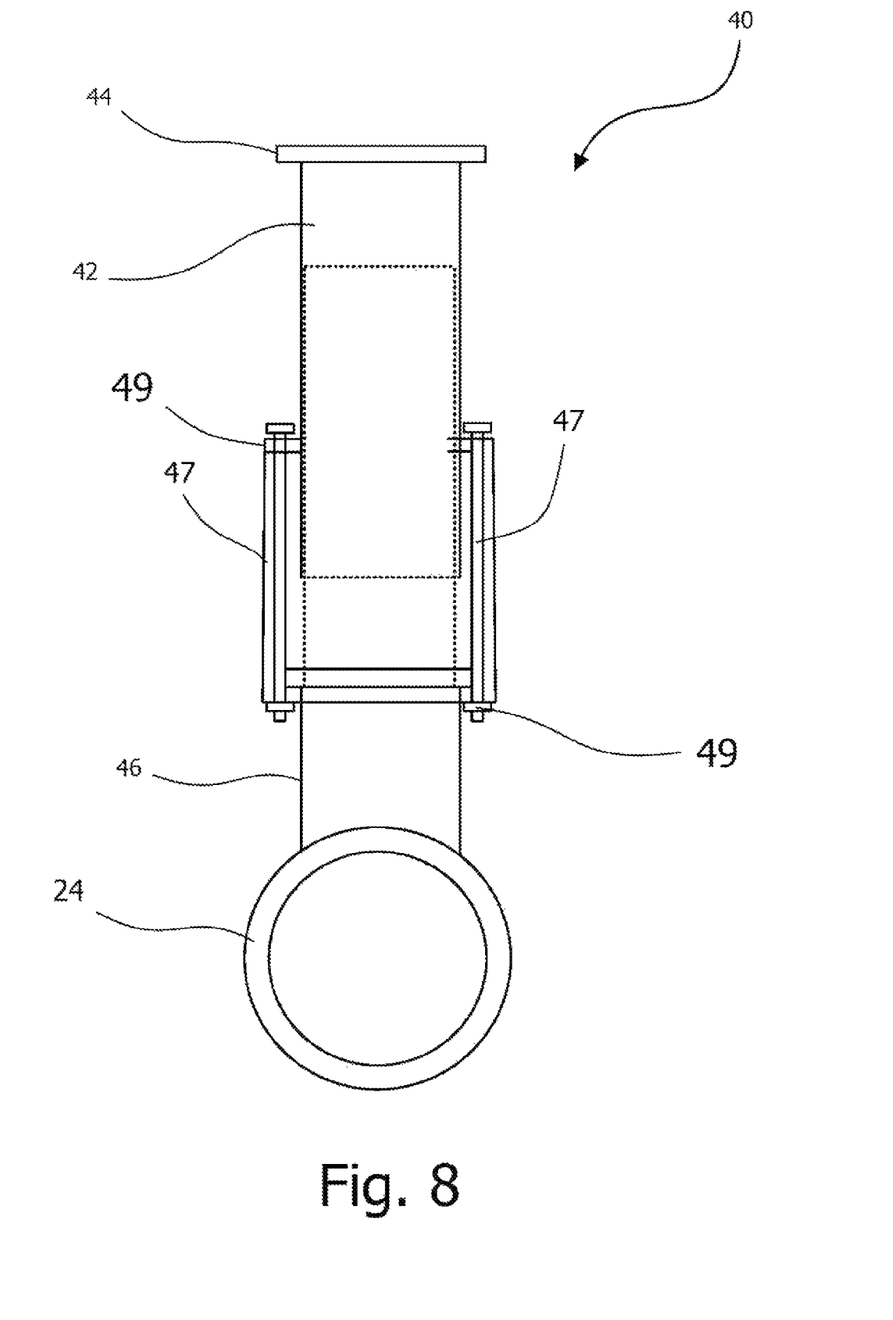
FIG. 8 is a front side view of an alternative embodiment of an adjustable stand pipe module.
Figure 9:
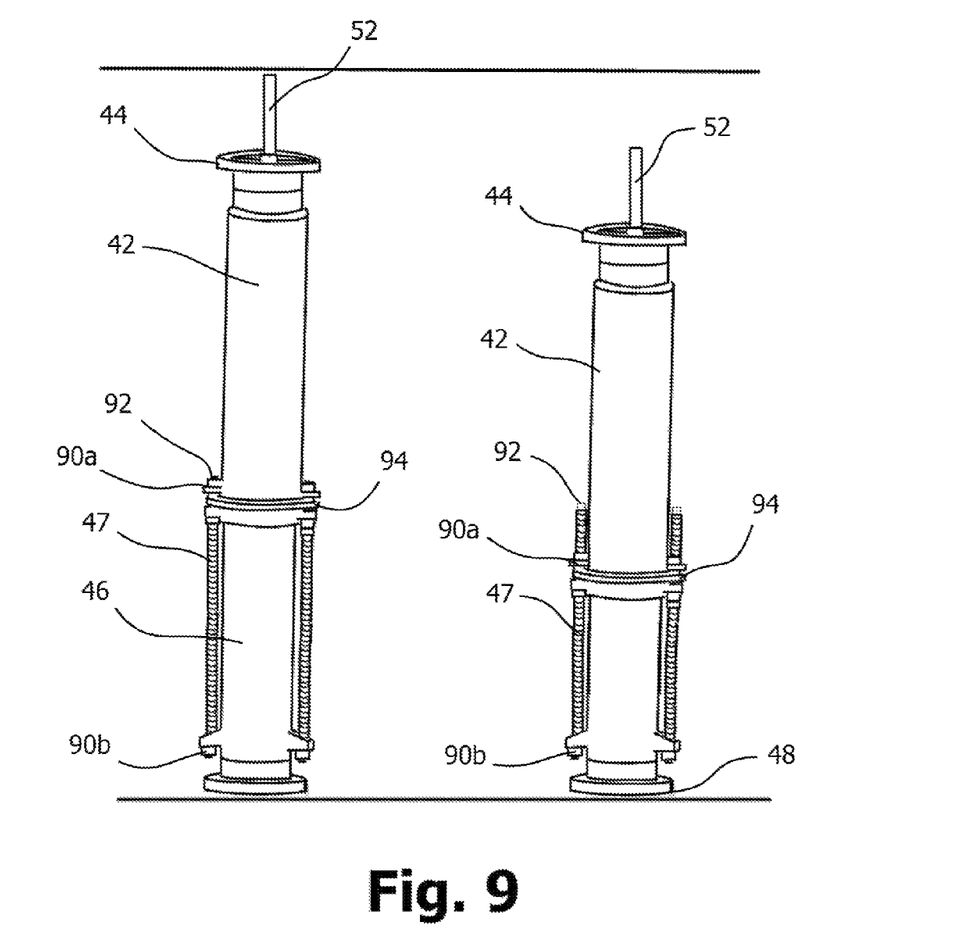
FIG. 9 is a front side perspective view of two adjustable stand pipe modules showing different adjustment positions.

As best seen in FIG. 8 and FIG. 9, for one embodiment, stand pipe module (40) comprises a first stand pipe element (42) mechanically associated with a second stand pipe element (46) to define a movable relationship. As before, the first stand pipe element (42) defines an inner diameter that is bigger than the outer diameter of the second stand pipe element (46) so that the second stand pipe element (46) may be inserted into (or slide into) the first stand pipe element (42) thereby defining said telescoping function/configuration. For the current embodiment, however, a portion of the first stand pipe element (42) and a portion of the second stand pipe element (46) are each configured with at least one pair of stand pipe interfaces (90) and a stand pipe interface (90) suitably configured for receiving at least one external stand pipe length adjuster (47). For the embodiment shown in FIG. 8 and FIG. 9, such stand pipe length adjuster (47) comprises two external thread rods. At least one of the stand pipe interfaces (90) define a threaded interface (90a) configured to receive threaded rod (47) so that rotating the threaded rod (47) or rotating the stand pipe interface (90a) causes the second stand pipe element (46) to slide in or out of the second stand pipe element (42) (depending on the direction of rotation) thereby changing the overall length of stand pipe module (40).

Stand pipe interface (90) may also define a non-threaded interface (90b) configured to simply retain one end of thread rod (47) so that such rod simply rotates within such interface (90b). Preferably the top of thread rod (47) defines a drive interface (92) configured for being associated with drive element of a tool that is used to rotate threaded rod (47). For the embodiment depicted in FIG. 9, drive interface (92) is configured for being associated with a typical socket. For example, a socket associated with an electric drill could be used to rotate threaded rod (47). There are many embodiment of drive interface (92) that may be used without departing from the scope and spirit of the invention.

Still referring to FIG. 9, a sealing flange (94) is used at the end of the first stand pipe element where the second stand pipe element insets into the first stand pipe element. Such stand pipe sealing element is similar to the sealing element (78) used to seal the ball joint module (60).

The stand pipe module output (44) is mechanically associated with either a flex module (30) or a hydrant coupling system (26). For stand pipe modules (40) to be connected directly to a hydrant coupling system (26), the stand pipe module output (44) coupling is preferably configured to receive interchangeable flanges so that a plurality of stand pipe output couplings can be provided with each stand pipe flange type being configured to fit a particular manufacturer's hydrant coupling system (26).

Similarly, the "boot"/fluid source (24) coupling is also specific to the hydrant being associate with the boot via a stand pipe system. Thus, the stand pipe module input (48) is preferably mechanically associated with the fluid source coupler (24) with an interchangeable flange system. Such flange system comprises at least two flange types where the flanges are configured to be swapped out depending on the type of flange needed. Thus, for one configuration the stand pipe module (40) comes with a plurality on interchangeable input flanges and a plurality of interchangeable output flanges.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A coupler assembly for connecting a hydrant to a stand pipe associated with a fluid source, said coupler assembly comprising:
a flex module defining a flex module input and a flex module output where said flex module output is configured for being mechanically associated with the input of a hydrant via a first coupling assembly and wherein said flex module input is configured for being mechanically associated to a stand pipe module via a second coupling assembly wherein said stand pipe module extends through a support medium to a fluid source;
wherein said flex module defines a ball joint;
wherein at least one of said first coupling assembly and said second coupling assembly is configured to fail when a predefined hydrant-breakaway-pressure is exerted on the coupling thereby defining a flex module breakaway feature; and
wherein the flex module is further configured to move in response to a predefined flex-force exerted on said flex module without resulting in structural damage to said hydrant and wherein the predefined flex-force is less than said hydrant-breakaway-pressure.

2. A coupler assembly for connecting a hydrant to a stand pipe as in claim 1, further comprising an adjustment-element configured to set a flex module output angle.

3. A coupler assembly for connecting a hydrant to a stand pipe as in claim 2, wherein said adjustment-element defines as coil spring extending at least partially through said flex module.

4. A coupler assembly for connecting a hydrant to a stand pipe as in claim 3, wherein said adjustment-element is configured to hold the hydrant in the plumb position when not being flexed.

5. A coupler assembly for connecting a hydrant to a stand pipe as in claim 2, wherein said adjustment-element defines at least one set screw wherein said set screw is configured to break away and allow said flex module to move when a predefined amount of pressure on the hydrant body is exceeded.

6. A hydrant coupling system configured for connecting a hydrant to a fluid source, said hydrant coupling system comprising:
a stand pipe module comprising at least one stand pipe element defining a stand pipe input and an opposing stand pipe output wherein said stand pipe module extends through a support medium to a fluid source coupler in fluid communication with a fluid source wherein said stand pipe input is mechanically associated with said fluid source coupler thereby placing said stand pipe module in fluid communication with said fluid source;
a flex module defining a ball joint and comprising a flex module input and a flex module output wherein said flex module output is configured for being mechanically associated with a hydrant and wherein said flex module input is mechanically associated with said stand pipe output thereby placing said flex module in fluid communication with said fluid source;

an adjuster-element comprising at least one of (a) at least one set screw wherein said set screw is configured to break away and allow said flex module to move, and (b) a resilient element configured to allow said flex module to move without structural damage to said flex module, said hydrant and said stand pipe module;

a rod coupler defining a universal joint wherein said rod coupler extends at least partially through said flex module and at least partially through said stand pipe module and wherein said rod coupler is further configured to mechanically associate a nut defined by a hydrant to a valve configured to selectively allow and prevent fluid flow between said fluid source and the hydrant; and wherein said flex module is further configured to move a predefined amount in response to a force applied to said hydrant.

7. A hydrant coupling system as in claim 6, wherein said resilient element is a coil spring.

8. A hydrant coupling system as in claim 6, wherein said stand pipe module defines an expansion pipe and wherein said expansion pipe and said rod coupler can be adjusted to change the length of said stand pipe module.

9. A hydrant coupling system as in claim 6,
wherein said stand pipe module defines a first stand pipe element movably associated with a second stand pipe element and configured to allow the overall length of said stand pipe module to change by about 50%.

10. A hydrant system configured for connecting to a fluid source, said hydrant system comprising:
a telescoping stand pipe module comprising a first stand pipe element defining a first stand pipe module end and a second stand pipe element defining an opposing second stand pipe module end and wherein said first stand pipe element defines a diameter that is bigger than said second stand pipe element so that the second stand pipe element may be inserted into the first stand pipe element thereby defining a telescoping association;

wherein said stand pipe module is configured to extend through a support medium to a fluid source coupler in fluid communication with a fluid source wherein said second stand pipe module end is mechanically associated with said fluid source coupler thereby placing said stand pipe module in fluid communication with said fluid source;

a flex module and defining a flex module input and a flex module output wherein said flex module output is mechanically associated with a hydrant and wherein said flex module input is mechanically associated with said first stand pipe module end thereby placing said flex module and said hydrant in fluid communication with said fluid source;

a rod coupler defining a universal joint wherein said rod coupler extends from a nut defined by said hydrant, through said hydrant and to a universal joint located at least partially inside said flex module and at least partially through said stand pipe module to a valve configured to selectively allow and prevent fluid flow from said fluid source and to said hydrant.

11. A hydrant system configured for connecting to a fluid source as in claim 10, further comprising an adjuster-element comprising at least one of (a) at least one set screw wherein said set screw is configured to break away and allow said flex module to move a predefined amount without damage to said flex module and (b) a resilient element configured to allow said flex module to move a predefined amount without damage to said flex module.

12. A hydrant system configured for connecting to a fluid source as in claim 11, wherein said adjuster-element comprises a coil spring disposed inside said flex module.

13. A hydrant system configured for connecting to a fluid source as in claim 10, wherein said flex module defines one of (a) a ball joint and (b) an expansion joint.

14. A hydrant system configured for connecting to a fluid source as in claim 10, wherein said first stand pipe element defines a first type thread disposed along its inside surface and wherein said second stand pipe element defines a second type thread disposed along its outside surface wherein the first type thread and said second type thread are configured to be mechanically associated together so that a twisting force in a first directions lengthens the overall length of said stand pipe module and a twisting force in a second direction shortens the overall length of said stand pipe module.

15. A hydrant system configured for connecting to a fluid source as in claim 10, wherein said first stand pipe element and said second stand pipe module element define a sliding mechanical association activated by rotating at least one external thread rod.

\* \* \* \* \*